UNITED STATES PATENT OFFICE.

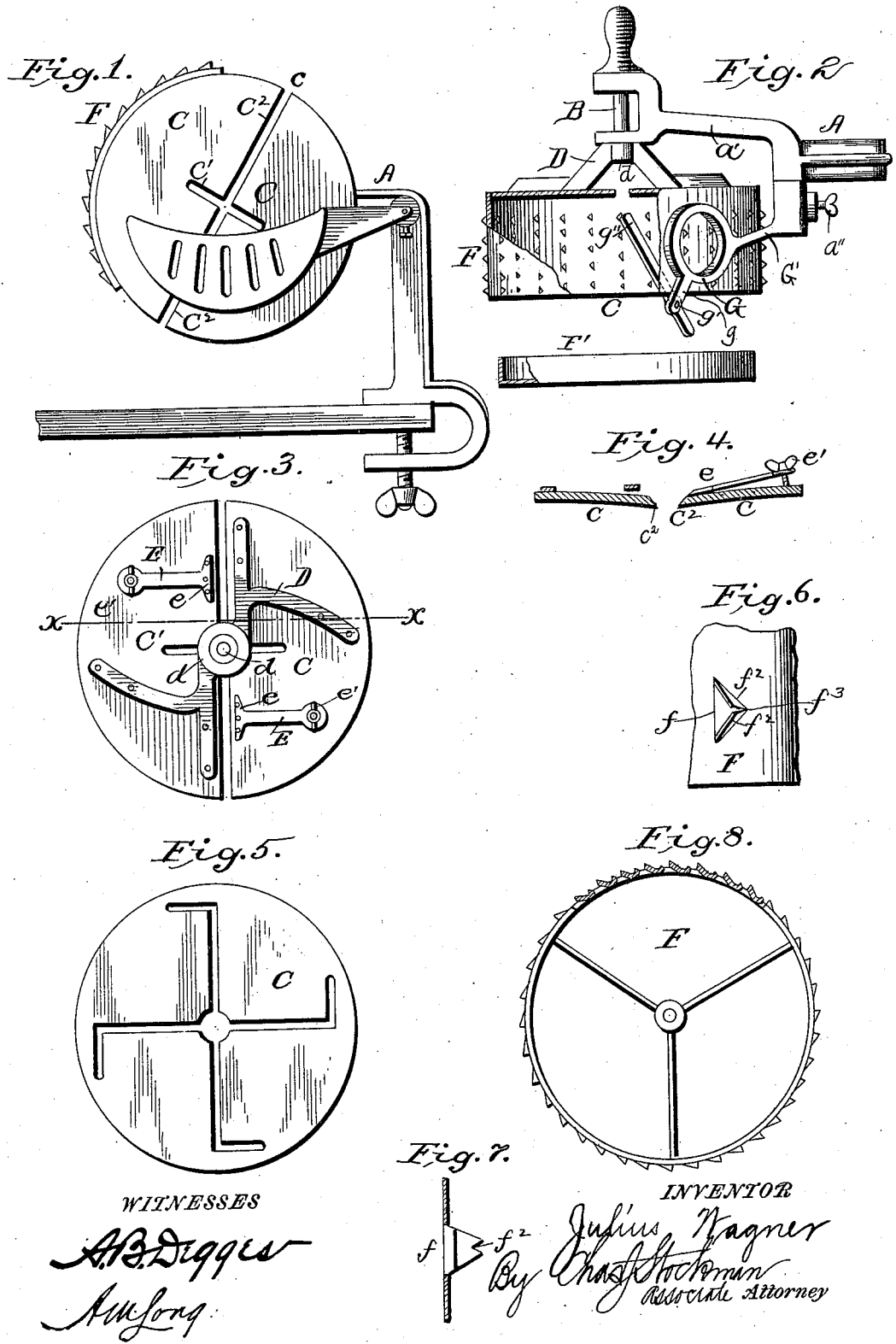

JULIUS WAGNER, OF READING, PENNSYLVANIA.

VEGETABLE CUTTER AND GRATER.

SPECIFICATION forming part of Letters Patent No. 576,705, dated February 9, 1897.

Application filed March 10, 1896. Serial No. 582,641. (No model.)

*To all whom it may concern:*

Be it known that I, JULIUS WAGNER, a citizen of the United States, residing at Reading, county of Berks, State of Pennsylvania, have invented certain Improvements in Vegetable Cutters and Graters, of which the following is a specification.

My invention relates to vegetable cutters and graters of the class shown and described in Patent No. 543,201, issued to me July 23, 1895; and it consists in certain improvements which are fully described in connection with the accompanying drawings and which are specifically pointed out in the subjoined claims.

Figure 1 is a front elevation of a machine having my improved cutter-disk applied thereto, a portion of the cylindrical grater being also indicated as attached to the periphery of the disk. Fig. 2 is a plan view of the same, partly in section. Fig. 3 is a rear view of the cutter-disk shown in Fig. 1, and Fig. 4 is a sectional view of the same on the line $x\,x$ of Fig. 3. Fig. 5 shows a modified form of cutter-disk. Figs. 6, 7, and 8 are different views illustrating the cylindrical grater.

The supporting-frame A is similar in construction to that shown in my patent referred to, and the cutter-disk C, as represented, is attached to a crank-shaft B, mounted in the frame A in the same manner.

The cutter-disk C is of sheet metal, and the knives or cutters are preferably formed integral with it. This I accomplish by cutting or slotting the disk, as shown, for instance, at $c$ and $c'$, Fig. 1, so as to provide one or more radially-arranged edges $c^2\,c^2$, extending, if desired, from the center of the disk to the periphery, so as to divide the disk-plate into separate sections C and C, or a less distance, so as to leave the disk in one piece, as indicated, for instance, in Fig. 5. In either case these edges are sharpened to serve as cutters or knives and are bent outward beyond the plane of the disk, so as to make a cut of greater or less thickness. This distance is preferably made variable by means of suitable devices, as indicated in Figs. 3 and 4. These consist, as shown, of rigid connections or arms E, firmly fixed at one end $e$ to the rear face of the disk and having the other free end adjustable with relation to the disk by means of a regulating-screw at $e'$, the cutting edge $c^2$ being thus forcibly bent outward to any desired extent, while the elasticity of the metal serves to return it when released to its normal plane.

The disk C C' is secured to a rigid frame D, which is arranged to firmly unite and stiffen it, while at the same time permitting the cutting edges $c^2$ to be bent outward, as described. It also serves as a means of attachment to the shaft B, having a central connecting-boss $d$, preferably located at a sufficient distance from the rear face of the disk to permit the free passage at the center of material being operated upon, as in a prior patent referred to.

In addition to the cutting-disk C, I employ an improved grater attachment F. This is of cylindrical shape and is preferably attached to the periphery of the cutter-disk, as indicated in Figs. 1 and 2, in any suitable manner, though, if desired, it may be adapted to attach directly to the shaft B, independently of the cutter-disk, in the manner indicated in Fig. 8. In either case the grating is effected by holding the material to be operated upon in contact with the periphery of the rotating cylinder, which is adapted to the purpose by means of specially-shaped teeth and perforations, as shown in Figs. 6, 7, and 8. These are formed by pressing the sheet metal outward by means of a tool adapted to form a perforation $f$ in the shape of an isosceles triangle, the base of which lies parallel with the axis of the grater-cylinder and in the direction of its rotation, while the outwardly-turned metal is divided so as to form two similar triangular teeth $f^2\,f^2$, having a V-shaped space $f^3$ between them.

In order to support the material upon and permit the proper feeding of the same to the grater, I provide a ring G, located above the grater and having an arm G' extending in one direction therefrom and mounted so as to swing upon an arm $a'$ of the frame A, to which it is adjustably secured by the set-screw $a''$. This ring is provided with a wiping attachment embodying an arm $g$, which projects beyond the edge of the grater, and a finger $g''$, which is pivoted intermediate of its ends to the outer end of said arm at $g'$ and is adapted to be swung into the cylinder, if desired, so as to wipe off the grated material from the inner curved surface of the grater; and I also provide an outer cap or cover F', which may be used to close the grater-cylinder, so as to retain the gratings during the operation of the machine, or to convert the grater-cylinder when detached into a receptacle for the cuttings made by the cutter-disk C or other similar uses.

Having thus fully described my invention, what I claim is—

1. In a vegetable cutter and grater, the combination of the frame, the rotatable cutter-disk, the cylindrical grater removably attached at one end to said cutter-disk and closed at said end thereby, and a removable cap for closing the other end of said grater, substantially as described and for the purposes specified.

2. In a vegetable-grater, the combination with the frame, and the grater-cylinder, of a feed device above said grater, and a pivoted arm supported by said feed device and adapted to be swung into the interior of said cylinder, substantially as described and for the purposes specified.

3. In a vegetable-grater, the combination with the frame, and the grater-cylinder, of a feed device, comprising a ring above said grater and a pivoted arm carrying said ring, and a wiper attachment to said feed device, comprising an arm projecting from said ring to the edge of the grater, and a finger pivoted to the free end of the latter arm and arranged to be swung into the grater, substantially as specified.

In testimony whereof I affix my signature in presence of two witnesses.

JULIUS WAGNER.

Witnesses:
W. G. STEWART,
WM. A. H. SCHMEHL.